United States Patent Office 2,850,480
Patented Sept. 2, 1958

2,850,480

HYDROXYALKYL ALKENYLARYL ETHERS AND POLYMERS THEREFROM

Gaetano F. D'Alelio, Pittsburgh, Pa., assignor to Koppers Company, Inc., a corporation of Delaware No Drawing. Application October 20, 1954
Serial No. 463,596

30 Claims. (Cl. 260—47)

This invention is concerned with certain new hydroxyalkyl alkenylaryl ethers. It is concerned with these substances in a monomeric as well as polymeric form. Furthermore, the invention is concerned with insoluble or "cured" polymers which can be obtained by treating hydroxyalkyl alkenylaryl ether polymers to cause cross-linking.

The invention is particularly concerned with hydroxyalkyl alkenylaryl ethers of the formula

$$CH_2=CR-Ar-O-C_nH_{2n}OH$$

in which R is chosen from the class consisting of hydrogen and methyl, Ar is an arylene radical and $n$ is an integer having a value no greater than 8.

In particular the invention is concerned with hydroxyalkyl vinyl- and isopropenyl-phenyl ethers. It will be realized that polymers of these monomers contain hydroxyalkyl groups. These polymers are useful in many polymer applications such as for molding, coatings, laminating and adhesives by, for example, esterification with drying oil fatty acids for paints, reaction with polyisocyanates or polyoxiranes and the like.

As used herein the term "polymer" embraces both homopolymers and copolymers. The term "copolymer" as used herein embraces polymeric materials derived from the polymerization of two or more monomeric materials. That is, 2, 3, 4, 5 . . . ad infinitum copolymerizable monomeric substances can be copolymerized to produce "a copolymer." As used herein the terms "parts" and "percentages" indicate parts and percentages by weight unless otherwise specified. The invention is illustrated by, but not restricted to, the following preferred embodiments:

EXAMPLE I
*2-(2-vinylphenoxy)-ethanol*

A cold aqueous solution of 2-vinylphenolate prepared from 24 parts 2-vinylphenol and 8.4 parts sodium hydroxide in 100 parts of water is added with stirring over a period of approximately 1 hour to 32 parts of ethylene chlorohydrin at 75° C. and the mixture is stirred for an additional hour at 75° C. The cooled reaction mixture is extracted with ether. The ether is washed with 300 parts of water containing 35 parts sodium hydroxide in four portions to remove unreacted 2-vinylphenol. The caustic-washed ether solution is evaporated to yield 12.5 parts of a yellow oil which is predominantly 2-(2-vinylphenoxy)-ethanol. This compound is identified by its para-nitrobenzoate derivative which derivative upon crystallization from methanol is obtained as cream-colored crystals, having a melting point of 70.7° C. Analysis of this derivative for nitrogen yields results which are in substantial agreement with the theoretical percentage.

EXAMPLE II
*3-(2-vinylphenoxy)-propanol*

A cold solution of vinylphenolate prepared from 24 parts 2-vinylphenol, 16.8 parts sodium hydroxide and 200 parts water is added with stirring to 40 parts trimethylene chlorohydrin at 75° C. and stirring is continued for one hour at 75–85° C. The cooled reaction mixture is ether-extracted. The ether extract is caustic-washed to remove unreacted 3-vinylphenol. The ether is removed by evaporation to yield a residual oil which is principally 3-(2-vinylphenoxy)-propanol. The compound is identified by preparation of the para-nitrobenzoate derivative, which is obtained as pale yellow crystals from methanol or cyclohexane, having a melting point of 72.5–73.5° C. Analysis of this derivative for nitrogen yields results which are in substantial agreement with the theoretical percentage.

EXAMPLE III
*1-(2-vinylphenoxy)-2-propanol*

Example II is repeated substituting for the trimethylene chlorohydrin there used, an equal quantity of propylene chlorohydrin. There is obtained 12 parts of a yellow oil which is predominantly 1-(2-vinylphenoxy)-2-propanol. This compound is identified by hydrogenation and preparation of the para-nitrobenzoate derivative, which yields colorless crystals from methanol, having a melting point of 95.5–96° C. Analysis of this compound for nitrogen yields results which are in substantial agreement with the theoretical percentage.

EXAMPLE IV
*2-(4-isopropenylphenoxy)-ethanol*

An aqueous solution of 4-isopropenylphenolate prepared from 50 parts 4-isopropenylphenol, 30 parts sodium hydroxide, and 300 parts water, is added with stirring at 75° C. over a period of 1 hour to 60 parts ethylene chlorohydrin and the stirring is continued for an additional one and a half hours. The reaction mixture is cooled and a brownish, clear waxy solid is removed by filtration. It is dissolved in ether and washed with aqueous caustic to remove unreacted 4-isopropenylphenolate. Vacuum evaporation of the caustic-washed ether solution yields 60 parts of a waxy solid which upon crystallization from benzene yields white plates having a melting point of 84.5° C. The compound is characterized by hydrogenation and preparation of the para-nitrobenzoate derivative of the hydrogenated compound which is obtained as cream-colored heavy needles from methanol, having a melting point of 103–104° C. Analysis of the para-nitrobenzoate derivative for nitrogen yields results which are in substantial agreement with theoretical percentages.

EXAMPLE V
*3-(4-isopropenylphenoxy)-propanol*

Example IV is repeated substituting for the ethylene chlorohydrin there used, 70 parts trimethylene chlorohydrin. Crystallization of the product obtained from benzene yields 3-(4-isopropenylphenoxy)-propanol, having a melting point of 80.5°–82° C. The compound is characterized by preparation of the para-nitrobenzoate derivative which is obtained as pale yellow plates from methanol having a melting point of 99.5–100° C. Analysis of this derivative for nitrogen yields results which are in substantial agreement with the theoretical percentage.

EXAMPLE VI
*1-(4-isopropenylphenoxy)-2-propanol*

A mixture of 60 parts 4-isopropenylphenol, 20 parts sodium hydroxide, 80 parts water, and 30 parts propylene oxide are charged to a suitable size glass-lined pressure-resistant vessel and the temperature raised to 85° C. over approximately one and a half hours. The reaction is maintained at 85° C. for approximately two hours. The reaction mixture is cooled, diluted with 750 parts water and extracted with ether. The ether extract is washed with aqueous caustic to remove unreacted 4-isopropenylphenol. The ether is evaporated to yield a white solid which upon recrystallization from benzene yields 1-(4-isopropenylphenoxy)-2-propanol in the form of white crystals melting at 85°–86° C. This compound is identified by preparation of the para-nitrobenzoate derivative which is obtained as a yellow powder from methanol, having a melting point of 73–75° C. Analysis of this derivative for nitrogen yields results which are in substantial agreement with the theoretical percentage.

It will be realized that in the foregoing examples there can be substituted for the 2-vinylphenol and 4-isopropenylphenol there used equimolar quantities of alkenyl phenols illustrated by such compounds as for example, 3-vinylphenol, 4-vinylphenol, 3-isopropenylphenol, the vinyl and isopropenyl-1- and 2-naphthols and the like. Additionally, in place of the halohydrins and alkylene oxide utilized, there can be used other halohydrins and alkylene oxides such as, for example, 2,3-epoxypentane, 3,4-epoxypentane, 2,3-epoxyoctane, tetra-, penta-, hexa-, hepta-, and octamethylene chlorohydrins and the like. There are obtained the various hydroxyalkyl alkenylaryl ethers of this invention which are characterized by hydrogen absorption and carbon and hydrogen analyses which are in substantial agreement with the theoretical values.

EXAMPLE VII

2-(2-vinylphenoxy)-ethanol

One hundred parts of 2-(2-vinylphenoxy)-ethanol obtained as in Example I is admixed with one-half part benzoyl peroxide. The atmosphere is swept out and filled with nitrogen. The compound is then heated at approximately 80° C. under an atmosphere of nitrogen for approximately one to two days. There is obtained polymeric 2-(2-vinylphenoxy)-ethanol which is a linear, soluble polymer.

There can be substituted for the 2-(2-vinylphenoxy)-ethanol here used, the various other hydroxyalkyl alkenylaryl ethers of this invention such as, for example, the compounds illustrated in Examples II—VI inclusive herein, and there are obtained linear, soluble homopolymers. Further, for the benzoyl peroxide utilized in this example there can be utilized a variety of peroxy catalysts such as hydrogen, acetyl, acetyl-benzoyl, phthalyl and lauroyl peroxides, tertiary-butyl hydroperoxide, etc., and other percompounds, for example ammonia persulfate, sodium persulfate, sodium perchlorate and the like.

The foregoing example illustrates the preparation of a polymer of a hydroxyalkyl alkenylaryl ether having a plurality of repeating units of the formula

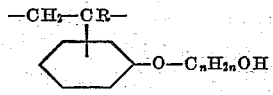

EXAMPLE VIII

Ninety parts styrene and 10 parts 3-(2-vinylphenoxy)-propanol obtained as in Example II are polymerized according to the procedure outlined in Example VII. There is obtained a linear, soluble polymer.

EXAMPLE IX

Example VIII is repeated substituting for the styrene there used 90 parts of butadiene. There is obtained a linear, soluble copolymer.

EXAMPLE X

Example VIII is repeated substituting for the styrene there used 90 parts of acrylonitrile. There is obtained a cream-colored, linear, soluble copolymer.

EXAMPLE XI

Example VIII is repeated substituting for the reactants there utilized 50 parts 3-(2-vinylphenoxy)-propanol, 50 parts maleic anhydride and one part benzoyl peroxide dissolved in 500 parts xylene. At the end of the heating the xylene is removed by vacuum distillation. There is obtained a linear, soluble copolymer. It is to be noted that while this polymerization is attempted in the absence of a solvent such as xylene, the reaction sometimes proceeds rapidly with resultant charring.

EXAMPLE XII

The procedure of Example VIII is repeated substituting for the styrene there used an equal amount of methyl methacrylate. There is obtained a yellow solid, soluble polymer.

It will be realized that the Examples VIII through XII illustrate a variety of ethylenically unsaturated monomers which can be copolymerized with hydroxyalkyl vinylaryl ethers. The various hydroxyalkyl vinylaryl ethers of this invention can be utilized in the foregoing procedures for the particular ethers there used. Further, mixtures of one or more of the ethers of this invention can be copolymerized with various copolymerizable ethylenically unsaturated monomers as illustrated in the foregoing examples or with mixtures of two or more of such ethylenically unsaturated monomers to produce polymers.

EXAMPLE XIII

The procedure of Example VIII is repeated substituting for the reactant 3-(2-vinylphenoxy)-propanol there used, an equal weight of 3-(4-isopropenylphenoxy)-propanol. There is obtained a soft polymeric gel.

EXAMPLE XIV

Example XIII is repeated substituting for the styrene there used an equal weight of butadiene. There is obtained a linear, soluble polymer.

EXAMPLE XV

Example XIII is repeated substituting for the styrene there used an equal weight of acrylonitrile. There is obtained a soluble, linear polymer.

EXAMPLE XVI

The procedure of Example XI is repeated substituting for the vinylphenoxy propanol there used an equal weight of 3-(4-isopropenylphenoxy)-propanol. There is obtained a polymeric yellow powder.

EXAMPLE XVII

The procedure of XVI is repeated substituting for the styrene there used an equal weight of methyl methacrylate. There is obtained a cloudy yellow, hard, tough, solid polymer.

EXAMPLE XVIII

One hundred parts of the polymer of Example VIII is admixed with 4 parts 2,4-toluene diisocyanate and 1 part ethylenediamine and the mixture heated for an hour at 75° C. There is obtained an insoluble, infusible cross-linked polymer. There can be substituted for the polymer of Example VIII used above, polymers of the various hydroxyalkyl alkenylaryl ethers of this invention. Additionally, there can be substituted for the 2,4-toluene diisocyanate, other diisocyanates such as phenylene diisocyanate, 2,6-toluene diisocyanate, 1,5-naphthalene diisocyanate, 1-chloro-1-phenylene-2,4-diisocyanate, 4,4'-xenylene diisocyanate, methylene bis-(4-phenylisocyanate), hexamethylene diisocyanate, tetramethylene diisocyanate and the like. The amount of these diisocyanates utilized is governed by the degree of cross-linking desired.

EXAMPLE XIX

One hundred parts of the polymer of Example VII is admixed with 10 parts of the diglycidyl ether of bisphenol and 1 part ethylene diamine and the mixture heated to approximately 75° C. There is obtained a thermoset resin.

EXAMPLE XX

Example XIX is repeated utilizing in place of the diglycidyl ether of bisphenol an equal weight of the resin described at column 7 of my U. S. Patent 2,658,885, granted Nov. 10, 1953. There is obtained a thermoset resin. It will be realized that the various epoxyalkoxy hydrocarbon-substituted-phenol aldehyde resins described in that patent can be utilized in the foregoing procedures. Additionally the epoxyalkoxy chlorine-substituted-phenol aldehyde resins described in my U. S. Patent 2,658,884, also granted Nov. 10, 1953, can be utilized in the foregoing procedure.

It is to be noted that in place of ethylene diamine catalyst utilized in Examples XVIII and XIX there can be substituted equivalent portions of such amine catalysts such as tetrahydroquinoline and piperidine to obtain substantially similar results.

EXAMPLE XXI

One hundred parts of the polymer of Example VIII is heated with 100 parts of linseed fatty acids in a closed stainless steel kettle equipped with an agitator, a means for introducing an inert gas below the surface of the liquid contents and a gas outlet means. The mixture is heated to approximately 175° C. and agitated while nitrogen is passed through the reaction mass to carry off the water produced by the esterification reaction.

There is obtained a modified polymer having greater oil-solubility than the original polymer, said modified polymer being particularly useful in the preparation of paints and varnishes. It will be realized that for the linseed fatty acids utilized above, there can be substituted a variety of drying oil and semi-drying oil fatty acid compositions. Such fatty acids are those derived from linseed, dehydrated castor, tung, perilla, soybean, oiticia, fish, hempseed, poppy seed, sunflower oils, etc. Further, the various linear, soluble polymers and copolymers of the monomers of this invention can be esterified according to the foregoing procedure to yield products of increased oil solubility and of utility in the preparation of paints and varnishes.

In those instances in which the hydroxyalkyl alkenylaryl ethers are copolymerized with ethylenically unsaturated monomers which do not possess other potentially reactive groups it is desirable that at least one per cent of the hydroxyalkyl alkenylaryl ethers be included in the polymer molecule for cross-linking purposes, such as, for example, by reaction with polyisocyanate or polyoxirane compounds as heretofore described.

It will be realized that the hydrophilic properties of the monomers and polymers of this invention can be increased by reaction by the introduction of a plurality of oxyalkylene groups into the molecule such as, for example, by the reaction of an alkylene oxide such as ethylene or propylene oxide with a hydroxyl group of the monomers or polymers of this invention. In particular, the epoxyalkyl alkenylaryl ethers described and claimed in my copending application filed concurrently herewith, can be reacted with the monomers and polymers of this invention to produce desirable modifications thereof.

While the invention has been described with reference to particular embodiments thereof, it will be understood that in its broadest aspects the invention may be variously embodied within the scope of the invention as set forth herein and in the appended claims.

As used herein the term "aryl" embraces a variety of aromatic nuclei such as phenyl, naphthyl, and the lower alkyl and halogen substituted nuclei, that is the aryl nuclei containing one or more methyl, ethyl, propyl, butyl, chloro- or bromo-substituents.

What is claimed is:

1. A hydroxyalkyl alkenylaryl ether of the formula

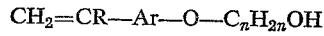

$$CH_2=CR-Ar-O-C_nH_{2n}OH$$

in which Ar is an arylene radical, R is chosen from the class consisting of hydrogen and methyl, and $n$ is an integer having a value no greater than 8.

2. 2-(2-vinylphenoxy)-ethanol.
3. 3-(2-vinylphenoxy)-propanol.
4. 1-(2-vinylphenoxy)-2-propanol.
5. 2-(4-isopropenylphenoxy)-ethanol.
6. 1-(4-isopropenylphenoxy)-2-propanol.
7. A homopolymer of a hydroxyalkyl alkenylaryl ether of claim 2.
8. A polymer of a hydroxyalkyl alkenylaryl ether having a plurality of repeating units of the formula

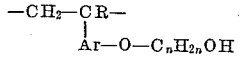

$$-CH_2-CR-$$
$$|$$
$$Ar-O-C_nH_{2n}OH$$

in which Ar is an arylene radical, R is chosen from the class consisting of hydrogen and methyl, and $n$ is an integer having a value no greater than 8.

9. A copolymer of a hydroxyalkyl alkenylaryl ether of claim 1 and at least one other copolymerizable ethylenically unsaturated monomer.
10. A copolymer of 3-(2-vinylphenoxy)-propanol and a polymerizable mass comprising at least one other copolymerizable ethylenically unsaturated monomer.
11. A copolymer of claim 9 in which the polymerizable mass comprises styrene.
12. A copolymer of claim 9 in which the polymerizable mass comprises butadiene.
13. A copolymer of claim 9 in which the polymerizable mass comprises acrylonitrile.
14. A copolymer of claim 9 in which the polymerizable mass comprises maleic anhydride.
15. A copolymer of claim 9 in which the polymerizable mass comprises methyl methacrylate.
16. An insoluble polymer of a hydroxyalkyl alkenylaryl ether of claim 1, said polymer containing a plurality of cross-linkages derived from said hydroxyalkyl groups.
17. An insoluble polymer of a polymerizable mass comprising at least one other polymerizable ethylenic monomer and 3-(2-vinylphenoxy)-propanol, said polymer containing a plurality of cross-linkages derived from said hydroxyalkyl groups.
18. An insoluble polymer of claim 16 in which the polymerizable mass comprises styrene.
19. An insoluble polymer of claim 16 in which the polymerizable mass comprises butadiene.
20. An insoluble polymer of claim 16 in which the polymerizable mass comprises acrylonitrile.
21. An insoluble polymer of claim 16 in which the polymerizable mass comprises maleic anhydride.
22. An insoluble polymer of claim 16 in which the polymerizable mass comprises methyl methacrylate.
23. A copolymer of 2-(2-vinylphenoxy)-ethanol and a polymerizable mass comprising at least one other copolymerizable ethylenically unsaturated monomer.
24. A copolymer of 1-(2-vinylphenoxy)-2-propanol and a polymerizable mass comprising at least one other copolymerizable ethylenically unsaturated monomer.
25. A copolymer of 2-(4-isopropenylphenoxy)-ethanol and a polymerizable mass comprising at least one other copolymerizable ethylenically unsaturated monomer.
26. A copolymer of 1-(4-isopropenylphenoxy)-2-propanol and a polymerizable mass comprising at least one other copolymerizable ethylenically unsaturated monomer.
27. An insoluble polymer of a polymerizable mass comprising at least one other polymerizable ethylenic monomer and 2-(2-vinylphenoxy)-ethanol, said polymer containing a plurality of cross-linkages derived from said hydroxyalkyl groups.

28. An insoluble polymer of a polymerizable mass comprising at least one other polymerizable ethylenic monomer and 1-(2-vinylphenoxy)-2-propanol, said polymer containing a plurality of cross-linkages derived from said hydroxyalkyl groups.

29. An insoluble polymer of a polymerizable mass comprising at least one other polymerizable ethylenic monomer and 2-(4-isopropenylphenoxy)-2-propanol, said polymer containing a plurality of cross-linkages derived from said hydroxyalkyl groups.

30. An insoluble polymer of a polymerizable mass comprising at least one other polymerizable ethylenic monomer and 1-(4-isopropenylphenoxy)-2-propanol, said polymer containing a plurality of cross-linkages derived from said hydroxyalkyl groups.

References Cited in the file of this patent

UNITED STATES PATENTS

| | | |
|---|---|---|
| 2,233,080 | Hester | Feb. 25, 1941 |
| 2,244,308 | Moyle | June 3, 1941 |
| 2,384,323 | McCleary | Sept. 4, 1945 |
| 2,500,011 | Sexton | Mar. 7, 1950 |
| 2,707,715 | Martin | May 3, 1955 |

OTHER REFERENCES

West: J. Chem. Soc., 1945, page 490. (Copy in Scientific Library.)